(12) United States Patent
Rezaeian et al.

(10) Patent No.: US 11,237,554 B2
(45) Date of Patent: Feb. 1, 2022

(54) DRIVER READINESS ASSESSMENT SYSTEM AND METHOD FOR VEHICLE

(71) Applicant: Steering Solutions IP Holding Corporation, Saginaw, MI (US)

(72) Inventors: Ayyoub Rezaeian, Troy, MI (US); Qi Peng, Madison Heights, MI (US); Abhishek Gurudutt, Southfield, MI (US); Harold Li, Rochester Hills, MI (US); Joachim J. Klesing, Rochester, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 122 days.

(21) Appl. No.: 16/294,435

(22) Filed: Mar. 6, 2019

(65) Prior Publication Data

US 2019/0278268 A1 Sep. 12, 2019

Related U.S. Application Data

(60) Provisional application No. 62/640,358, filed on Mar. 8, 2018.

(51) Int. Cl.
*G05D 1/00* (2006.01)
*G06F 3/01* (2006.01)
*G05D 1/02* (2020.01)

(52) U.S. Cl.
CPC ......... *G05D 1/0061* (2013.01); *G05D 1/0246* (2013.01); *G05D 1/0278* (2013.01); *G06F 3/013* (2013.01)

(58) Field of Classification Search
CPC .. G05D 1/0061; G05D 1/0246; G05D 1/0278; G06F 3/013
See application file for complete search history.

(56) References Cited

U.S. PATENT DOCUMENTS

| 9,718,406 | B2 * | 8/2017 | Mangin | G02B 27/01 |
| 10,067,505 | B2 * | 9/2018 | Ichikawa | B60W 60/0053 |
| 10,315,566 | B2 * | 6/2019 | Choi | G02B 27/0101 |
| 10,625,673 | B2 * | 4/2020 | Shibata | A61B 5/18 |

(Continued)

FOREIGN PATENT DOCUMENTS

| CN | 106379411 A | 2/2017 |
| CN | 107054373 A | 8/2017 |

(Continued)

OTHER PUBLICATIONS

Title: "SAE International Releases Updated Visual Chart for Its "Levels of Driving Automation" Standard for Self-Driving Vehicles"; Date: Dec. 11, 2018; Publisher: SAE.org; Issued a new visual chart to use with J3016 "Levels of Driving Automation" standard. (Year: 2018).*

(Continued)

*Primary Examiner* — James J Lee
*Assistant Examiner* — Tawri M Matsushige
(74) *Attorney, Agent, or Firm* — Dickinson Wright PLLC

(57) ABSTRACT

A steering control system for an autonomous or semi-autonomous vehicle including at least one gaze sensor determining a driver gaze angle. The system also includes a controller comparing the driver gaze angle to predetermined gaze angles required for future vehicle locations associated with vehicle maneuvers.

13 Claims, 7 Drawing Sheets

(56) References Cited

U.S. PATENT DOCUMENTS

| | | | |
|---|---|---|---|
| 10,640,122 B2* | 5/2020 | Kishi | G08G 1/166 |
| 10,671,075 B1* | 6/2020 | Kobilarov | G05D 1/0088 |
| 10,737,717 B2* | 8/2020 | Peng | B62D 15/025 |
| 2012/0046802 A1* | 2/2012 | Inou | B60W 30/10 |
| | | | 701/1 |
| 2014/0097957 A1* | 4/2014 | Breed | G08B 21/0407 |
| | | | 340/576 |
| 2017/0103865 A1 | 4/2017 | Rohde et al. | |
| 2017/0166222 A1* | 6/2017 | James | B60W 40/09 |
| 2017/0267238 A1* | 9/2017 | Mimura | B60W 50/14 |
| 2017/0308083 A1* | 10/2017 | Sato | B60Q 5/005 |
| 2018/0148071 A1* | 5/2018 | Kim | B60W 50/082 |
| 2019/0056782 A1* | 2/2019 | Rao | G06K 9/00604 |
| 2019/0064800 A1* | 2/2019 | Frazzoli | G05D 1/0223 |
| 2019/0213429 A1* | 7/2019 | Sicconi | G06F 3/016 |
| 2019/0250000 A1* | 8/2019 | Zhang | G05D 1/021 |

FOREIGN PATENT DOCUMENTS

| | | | |
|---|---|---|---|
| CN | 107428374 A | 12/2017 | |
| EP | 3239011 A1 | 11/2017 | |
| JP | 2011198247 A | 10/2011 | |

OTHER PUBLICATIONS

Title: "U.S. DoT chooses SAE J3016 for vehicle-autonomy policy guidance"; Date: Sep. 20, 2016; Publisher: SAE.org; Shows automated driving levels associated with levels 0-6. (Year: 2016).*

\* cited by examiner

DRIVER READINESS ASSESSMENT SYSTEM AND METHOD FOR VEHICLE

CROSS-REFERENCE TO RELATED APPLICATION

This application claims priority to U.S. Provisional Patent Application Ser. No. 62/640,358, filed Mar. 8, 2018, the disclosure of which is incorporated herein in its entirety.

BACKGROUND

The present application generally relates to steering systems used for driving a vehicle and, more particularly, to steering systems for use in an autonomous vehicle.

Various driver readiness assessment systems have been employed in vehicle systems. Regarding driver gaze, prior systems consider the driver to be paying attention to the road if the driver is looking at the windshield. Such systems are not effective for evaluations during or prior to certain situations, such as sharp turns, highway entrances/exits, and traffic signs, for example. Such examples require the driver to check surroundings, including various forward angles, as well as to the side of the vehicle.

SUMMARY

According to one aspect of the disclosure, a steering control system for an autonomous or semi-autonomous vehicle including at least one gaze sensor determining a driver gaze angle. The system also includes a controller comparing the driver gaze angle to predetermined gaze angles required for future vehicle locations associated with vehicle maneuvers.

According to another aspect of the disclosure, a method of transitioning from an autonomous steering mode to a manual steering mode of a vehicle is provided. The method includes monitoring a driver gaze angle with at least one gaze sensor. The method also includes determining a predetermined gaze angle required for future vehicle locations associated with vehicle maneuvers, wherein the predetermined gaze angle is angled away from a straight ahead trajectory of the vehicle. The method further includes comparing the driver gaze with the predetermined gaze angle.

According to yet another aspect of the disclosure, a steering control system for an autonomous or semi-autonomous vehicle includes a model predictive controller for calculating a driver attention level by providing at least one control input for a predicted vehicle position at future waypoints and comparing the at least one input to a robot input for the predicted vehicle position at future waypoints These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The embodiments described herein pertain to a system and method associated with a steering system of an autonomous vehicle. The embodiments described herein may be employed with various types of steering columns. In particular, electric power steering systems and autonomous or semi-autonomous driving systems are examples of vehicle steering columns that may benefit from the embodiments disclosed herein. The term autonomous or semi-autonomous refers to vehicles or vehicle sub-systems that are configured to perform operations without continuous input from a driver (e.g., steering, accelerating, braking etc.) and may be equipped with Advanced Driver Assist Steering (ADAS) system(s) to allow the vehicle to be autonomously controlled using sensing, steering, and/or braking technology.

The control system may include one or more controllers and processors that may be integrated with each other to store and receive data, process computations, and execute commands. In an autonomous steering mode, a driver is not required to provide steering control via the steering input device. In the event the driver desires to regain steering control of the vehicle, a prompt is submitted to transition the steering control back to the driver. Full driver steering control may be referred to as a manual steering mode of the vehicle.

Transitioning from the autonomous steering mode to the manual steering mode, in what is referred to as a transition steering mode, must be handled with many considerations due to the dynamic factors associated with steering the vehicle. To execute a safe and intuitive transition from the autonomous steering mode to the manual steering mode, the embodiments described herein and illustrated in the Figures evaluate driver readiness to determine if the transition mode may be safely completed to fully switch the vehicle to the manual steering mode.

Figure 3:
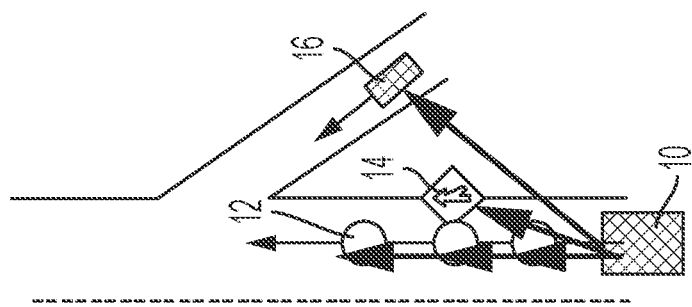
FIGS. 1-3 illustrate various driving situations requiring modification of driver gaze angle.
Figure 2:
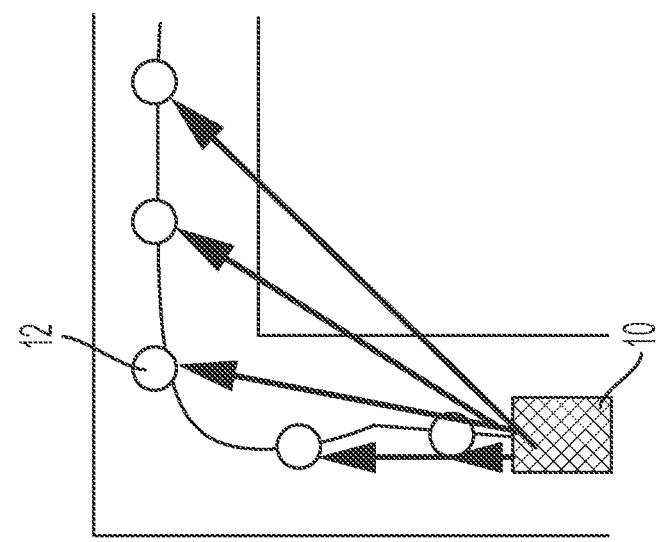
Figure 1:
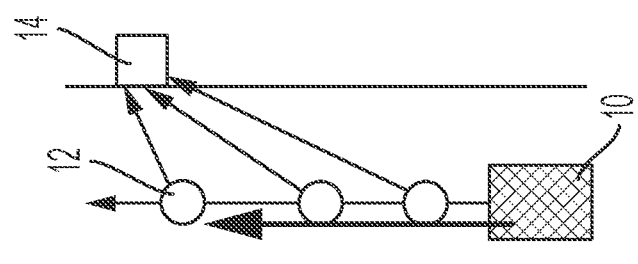

FIGS. 1-3 illustrate situations in which a driver's gaze may be best suited to viewing angles that are not completely straight ahead. The embodiments described herein assess whether the driver's gaze angle is suitable for upcoming driving maneuvers of a vehicle 10. The vehicle 10 is shown with upcoming trajectory waypoints 12 which represent a path that the vehicle 10 is projected to move along. In some embodiments (e.g., FIGS. 1 and 3), the projected path of the vehicle 10 is substantially straight ahead, but visual detection and monitoring of an object toward the side of the road is required. As shown, an object 14 on the side of the road (FIGS. 1 and 3) and maneuvers associated with merging traffic 16 (FIG. 3) require visual attention toward the object 14. A sharp turn (FIG. 2) is another example of a situation where the driver is required to utilize an angled gaze. These examples are merely illustrative and are not limiting of situations where an angled gaze may be advantageous.

Figure 4:
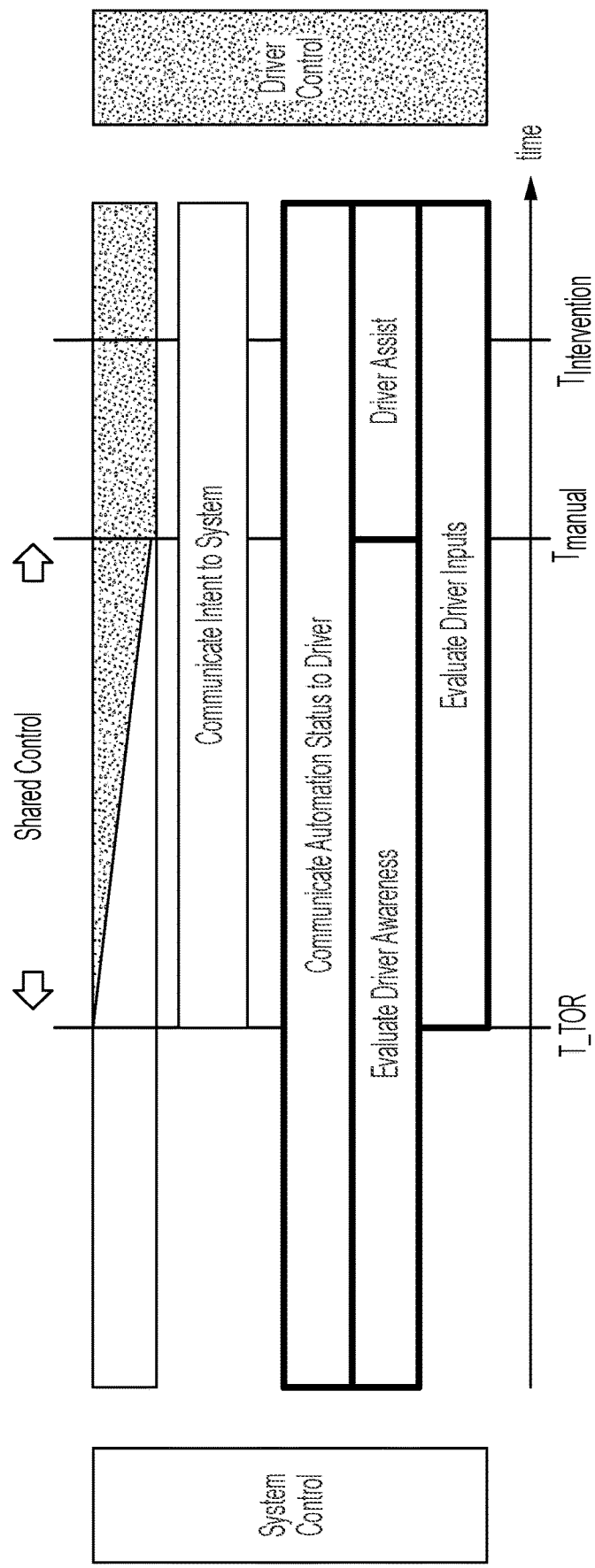
FIG. 4 illustrates various driving modes over a period of time.

FIG. 4 illustrates various stages of driving modes over an illustrated time period. Initially, the vehicle is in an autonomous driving mode. During the autonomous driving mode, one or more systems are communicating an automation status to the driver. The automation status includes information related to the driving condition that the vehicle is operating in (e.g., autonomous driving mode, transition driving mode, manual driving mode, etc.). During the autonomous driving mode, one or more systems are also evaluating driver awareness.

Some levels of autonomous driving vehicles allow a human vehicle operator to take over from the automated driving mode. The operator can request to operate the vehicle while the vehicle is being operated in the autonomous driving mode without having been issued a request to intervene by the autonomous driving system. In these cases, the autonomous driving system may delay relinquishing control to the manual driving mode to ensure a smooth transition to the manual driving mode, both for operator comfort and/or to prevent a hazardous condition from occurring.

At time, T_TOR, a prompt is made that alerts one or more vehicle control systems that the manual driving mode is desired or required and the transition driving mode is initiated. During the transition driving mode, certain vehicle actions, such as steering control, are performed based on an interaction between driver inputs and automated action carried out by the autonomous driving system(s). The transition mode may be a "blended" control of certain driver actions, where the percentage of driver control is gradually increased over time. At this point, the vehicle control system(s) continue with the automation status communication and the driver awareness evaluation. Additionally, the system(s) evaluate driver inputs, such as steering control, for example, and the intent of the driver is communicated to the system(s).

At time T_manual, upon satisfaction of various driver readiness parameters, the vehicle is switched to manual driving mode, with the system(s) remaining available for driver assistance. At time T-intervention, the vehicle has been fully transitioned to the manual driving mode. As shown, the driver input may continue to be evaluated subsequent to switching to the manual driving mode.

FIGS. 5-8 illustrate control systems and methods associated with a first driver awareness evaluation, defined as the time prior to T_manual. The embodiments associated with this time period use the produced trajectory by path planning and controller action to estimate the desired driver eye gaze angle. The future trajectory is calculated based on a predefined destination and traffic around the car which are estimated based on various sensors (e.g., camera, GPS), represented at "input layer" of FIG. 7.

Figure 5:
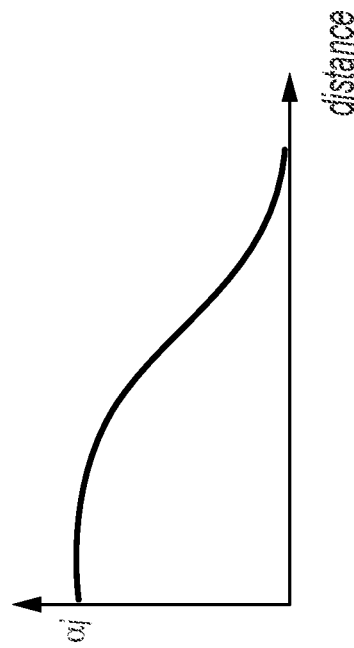
FIG. 5 illustrates future vehicle positions and driver gaze angles.

As shown in FIG. 5, the vehicle 10 will follow the produced trajectory (i.e., projected trajectory waypoints 12) and the driver is required to pay attention to the produced trajectory in a predefined manner. The following equation shows the desired driver eye gaze angle based on the future waypoints:

$$\text{Desired driver eye gaze angle} = a_1 a_1 + a_2 a_2 + a_3 a_3 + \ldots + a_N a_N$$

Figure 6:
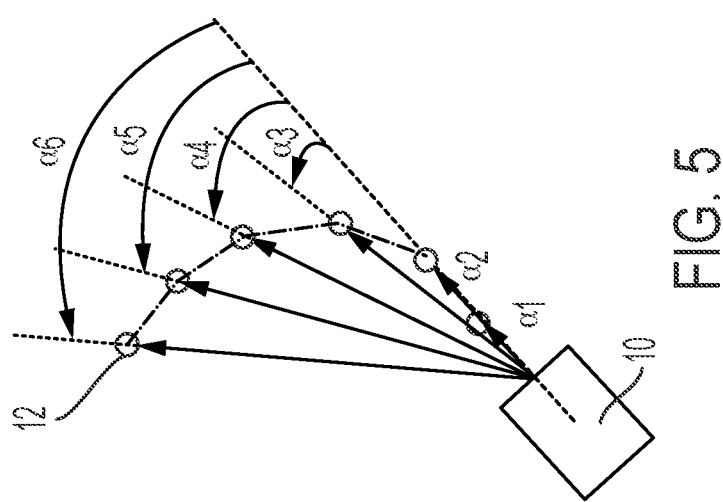
FIG. 6 is a plot of driver gaze angle coefficients as a function of distance of the future vehicle position from the vehicle.

The term $a_i$ (when i=1, 2, ..., N) is the weighted coefficient for each waypoint. These coefficient values are calculated based on the distance from the current vehicle location. The waypoints 12 which are closer to the current vehicle location will have more influence on the driver desired gaze angle. Thus, the weighted coefficients are greater for the waypoints 12 that are closer to the current vehicle location, as illustrated in FIG. 6.

The driver eye gaze angle is compared to the desired gaze angle (see "estimation layer" of FIG. 7), and if the error is small it indicates that the driver gaze is attentive and that the driver is ready for manual control. This error will be calculated during T_TOR to T_manual (and from T_manual to T_intervention). A threshold error is programmed in the controller and if the error is equal to or less than the threshold error for a requisite time period, the driver is considered ready for manual control. For example, if for at least 70% of the time the error is below the threshold error, it means that driver attention level is high.

Figure 7:
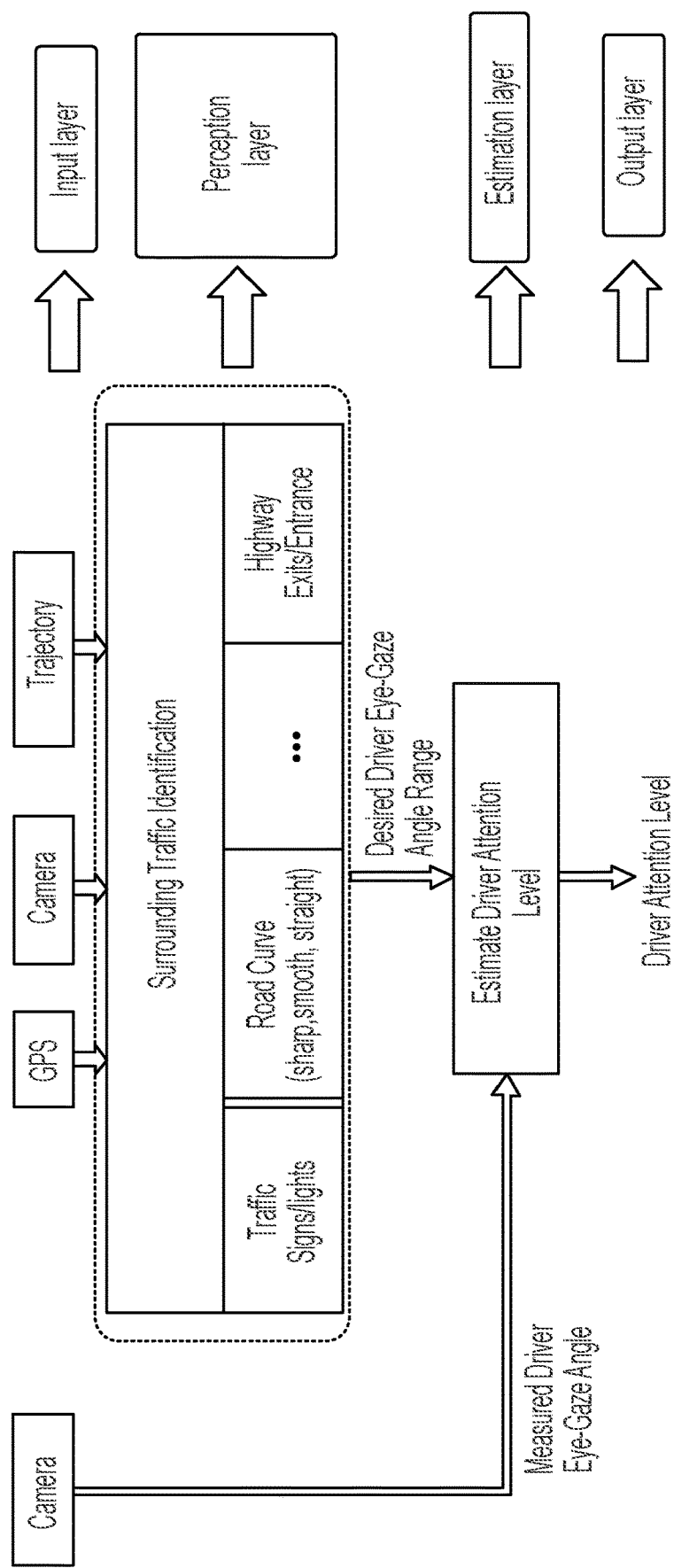
FIGS. 7 and 8 schematically illustrate systems and methods for conducting a first driver readiness evaluation.
Figure 8:
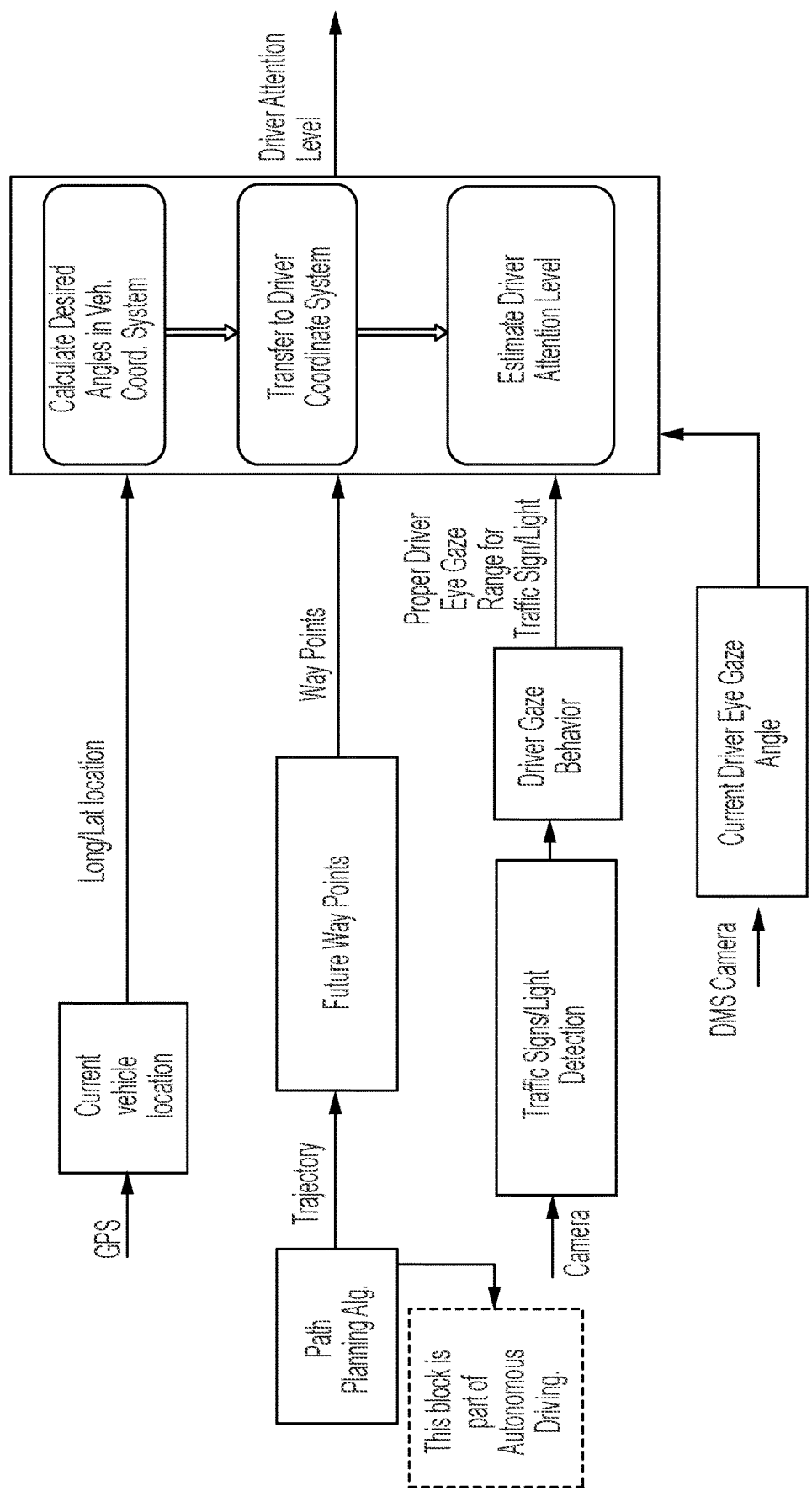

FIGS. 7 and 8 schematically illustrate the structure and method associated with the control system. In particular, the embodiments prepare a solution to measure driver attention level by finding desired driver eye gaze angles range based on the future vehicle trajectory and traffic signs/light detection. The measurement solution also includes developing an algorithm to estimate the level of driver attention to the road and surroundings (FIG. 8).

Figures 9, 10:
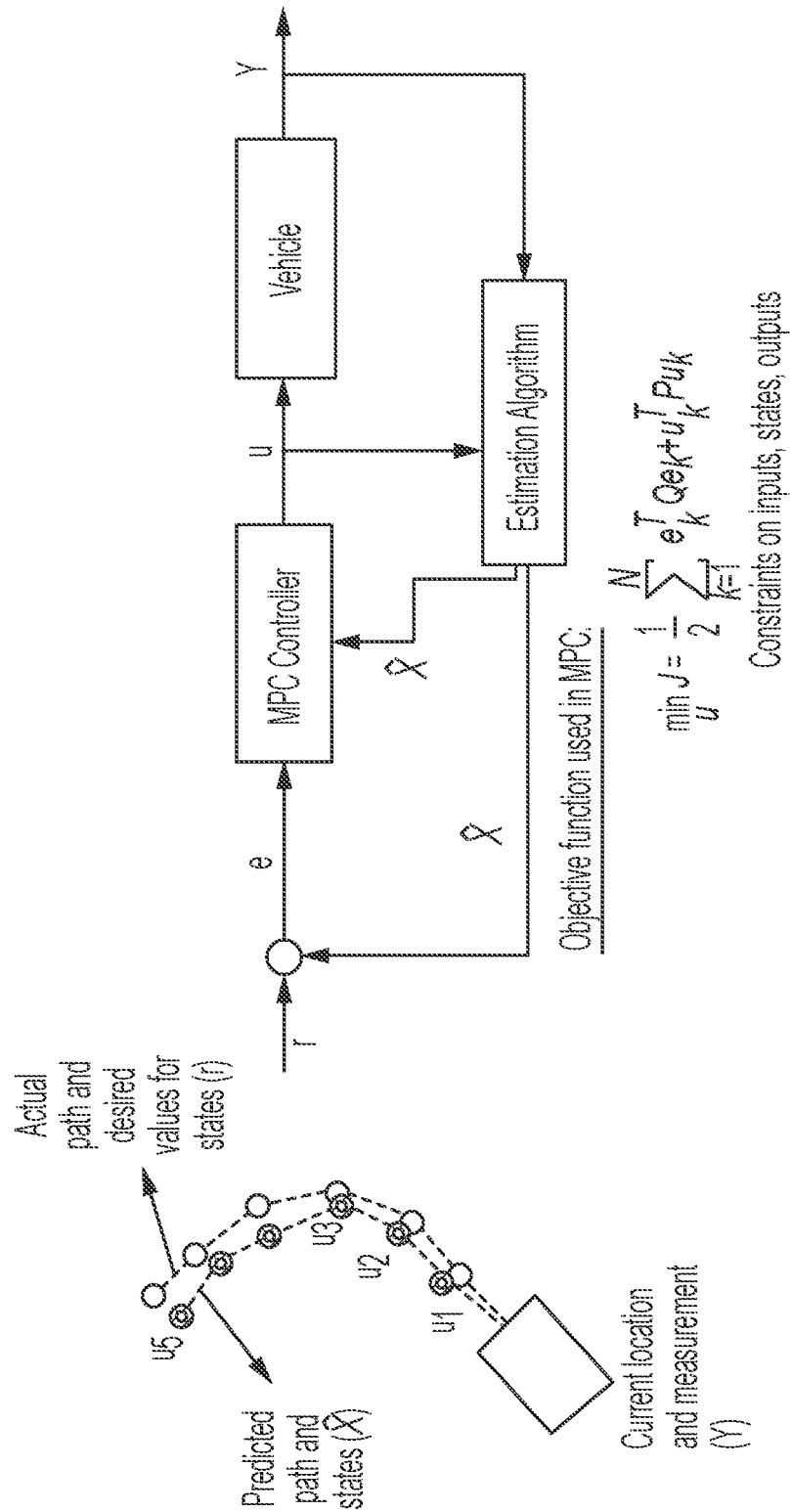
FIGS. 9-11 illustrate systems and methods for conducting a second driver readiness evaluation.
Figure 11:
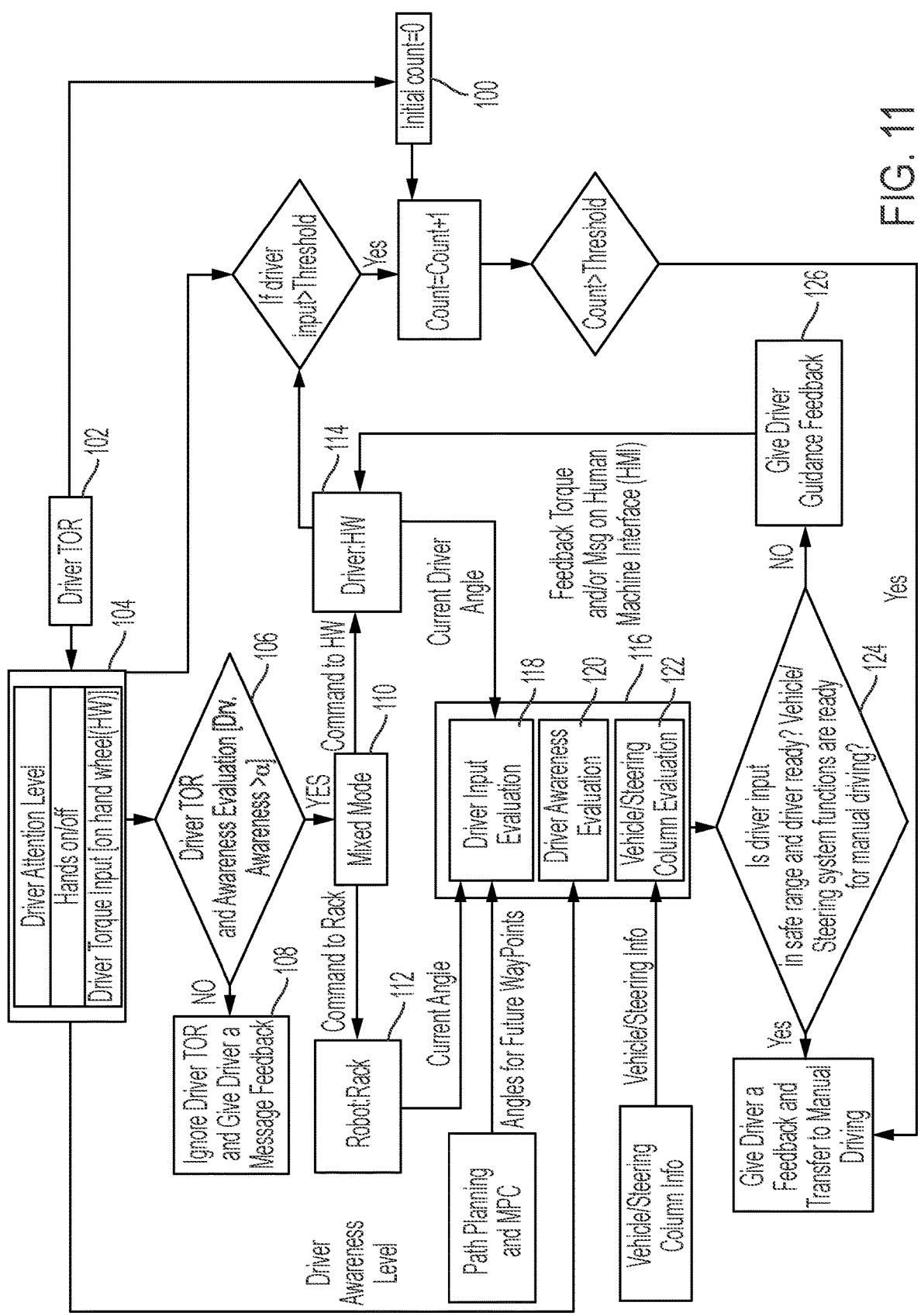

FIGS. 9-11 illustrate control systems and methods associated with a second driver awareness evaluation, defined as the time subsequent to T_TOR. The second driver awareness evaluation period allows the system(s) to evaluate driver inputs. The actions of the control system during the transition driving mode provides a solution to measure the confidence level on driver input during transition. The determined confidence level in driver inputs and driver attention are used to make decisions during robot and driver interaction.

During the transition driving mode, there is an interaction between driver and robot, as described above. Driver inputs need to be monitored during the transition driving mode to determine if the inputs are in predefined acceptable range. With a steer-by-wire system, the mixed mode (i.e., "blended" mode) may be employed. Then, the vehicle will be driven by the controller and driver inputs on the hand wheel can be monitored during transition. In addition, during the mixed mode, the system can provide feedback for the driver to guide the driver to a safe input region and/or give the driver a feedback about the status of driving mode (manual or autonomous).

As shown in FIGS. 9 and 10, a model predictive controller (MPC) provides control inputs for the predicted vehicle positions at future waypoints. The term u_i represents the control inputs calculated by the control system(s). Then, the system(s) monitor driver inputs and compare them with the robot inputs in future waypoints. When the errors between the driver inputs and the robot inputs are in the predetermined acceptable range and driver awareness level is high, the transition will be completed, and driver is provided control to drive the car in the manual driving mode.

FIG. 11 illustrates a method of using the model predictive controller. As shown, block 100 represents a process initiation. Block 102 is time T_TOR, where the system receives driver inputs related to various factors at block 104, with such factors being driver attention level, whether the hands are on or off a steering wheel and a measured driver torque input on the steering wheel, for example. At block 106, a driver awareness evaluation is conducted to determine if the driver's awareness is above a predetermined threshold. If it is not, the driver's take over request is denied and a message is provided to the driver at block 108. If the driver's awareness is greater than the predetermined threshold, the transition mode (e.g., mixed mode) is initiated at block 110. As described above, the transition mode results in the mixed/blended mode, represented with partial vehicle control with the autonomous driving system(s) at block 112 and manual operator control at block 114.

The gaze angle of the driver and the angle of the desired trajectory are provided to the MPC at block 116. Within block 116, blocks 118, 120 and 122 represent a driver input evaluation, a driver awareness evaluation and a vehicle/steering column evaluation, respectively. If all evaluations conclude at block 124 that the conditions are satisfied for manual driving mode, the driver is provided full control. If the evaluations do not satisfy the conditions, the driver may be provided with driver guidance feedback at block 126 and the blended control (i.e., transition driving mode) continues.

The embodiments disclosed herein provide for the transfer of authority from vehicle (e.g., robot) to driver with the control system and method described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering control system for an autonomous or semi-autonomous vehicle comprising:
   at least one gaze sensor determining a driver gaze angle; and
   a controller configured to:
      receive a predefined destination of the autonomous or semi-autonomous vehicle, and traffic information associated with an environment of the autonomous or semi-autonomous vehicle;
      estimate, using sensor data provided by at least one sensor, at least one condition of the environment of the autonomous or semi-autonomous vehicle, wherein the at least one condition of the environment of the autonomous or semi-autonomous vehicle indicates at least one object in the environment of the autonomous or semi-autonomous vehicle;
      determine at least one future vehicle location associated with at least one corresponding vehicle maneuver based on the predefined destination, the traffic information, and the at least one condition of the environment;
      identify future waypoints associated with the at least one future vehicle location associated with the at least one corresponding vehicle maneuver;
      generate, for each identified future waypoint, corresponding weight coefficients based on a current distance between the autonomous or semi-autonomous vehicle and each of the identified future waypoints;
      estimate at least one desired driver gaze angle based on at least one of the identified future waypoints and a corresponding weighted coefficient;
      compare the driver gaze angle to the estimated at least one desired driver gaze angle; and
      in response to a determination that the driver gaze angle is within a threshold range of the estimated at least one desired driver gaze angle for a predetermined period:
         initiate transition of a steering system of the autonomous or semi-autonomous vehicle from an autonomous steering control mode to a manual steering control mode;
         responsive to at least one driver input being outside of an acceptable range:
            partially control the steering system according to the autonomous steering control mode and partially control the steering system according to the manual control mode; and
            provide feedback to a driver of the autonomous or semi-autonomous vehicle; and
         responsive to at least one driver input being within the acceptable range, transition the steering system of the autonomous or semi-autonomous vehicle from the autonomous steering control mode to the manual steering control mode.

2. The system of claim 1, wherein the estimated at least one desired driver gaze angle is angled away from a straight ahead trajectory of the autonomous or semi-autonomous vehicle.

3. The system of claim 1, wherein the at least one sensor includes at least one GPS.

4. The system of claim 1, wherein the at least one sensor includes at least one camera.

5. The system of claim 1, wherein the controller compares the driver gaze angle to the estimated at least one desired driver gaze angle during a transition driving mode.

6. A method of transitioning from an autonomous steering mode to a manual steering mode of an autonomous or semi-autonomous vehicle comprising:
   determining a driver gaze angle with at least one gaze sensor;
   receiving a predefined destination of the autonomous or semi-autonomous vehicle, and traffic information associated with an environment of the autonomous or semi-autonomous vehicle;
   estimating, using sensor data provided by at least one sensor, at least one condition of the environment of the autonomous or semi-autonomous vehicle, wherein the at least one condition of the environment of the autonomous or semi-autonomous vehicle indicates at least one object in the environment of the autonomous or semi-autonomous vehicle;
   determining at least one future vehicle location associated with at least one corresponding vehicle maneuver based on the predefined destination, the traffic information, and the at least one condition of the environment;
   identifying future waypoints associated with the at least one future vehicle location associated with the at least one corresponding vehicle maneuver;
   generating, for each identified future waypoint, corresponding weight coefficients based on a current distance between the autonomous or semi-autonomous vehicle and each of the identified future waypoints;
   estimating at least one desired driver gaze angle based on at least one of the identified future waypoints and a corresponding weighted coefficient;
   comparing the driver gaze angle to the estimated at least one desired driver gaze angle; and
   in response to a determination that the driver gaze angle is within a threshold range of the estimated at least one desired driver gaze angle for a predetermined period:
      initiating transitioning of a steering system of the autonomous or semi-autonomous vehicle from an autonomous steering control mode to a manual steering control mode;

responsive to at least one driver input being outside of an acceptable range:

partially controlling the steering system according to the autonomous steering control mode and partially controlling the steering system according to the manual control mode; and providing feedback to the driver of the autonomous or semi-autonomous vehicle; and responsive to at least one manual driver input being within the acceptable range, transitioning the steering system of the autonomous or semi-autonomous vehicle from the autonomous steering control mode to the manual steering control mode.

7. The method of claim 6, wherein a driver prompt initiates a transition driving mode, the transition driving mode terminating upon entry of the manual steering control mode.

8. The method of claim 7, wherein the comparing the driver gaze angle to the estimated at least one desired driver gaze angle is performed during the transition driving mode.

9. The method of claim 7, wherein the comparing the driver gaze angle to the estimated at least one desired driver gaze angle is performed during an autonomous driving mode and the transition driving mode.

10. The method of claim 6, further comprising:
comparing the at least one manual driver input to a desired driver input.

11. The method of claim 10, wherein the at least one manual driver input comprises a steering column angle.

12. The method of claim 10, wherein the comparison between the manual driver input and the desired driver input is performed during transition from the autonomous steering control mode to the manual steering control mode.

13. The method of claim 6, wherein the feedback includes information to guide the driver to a safe manual driver input.

* * * * *